US00RE36726E

United States Patent [19]

Kakiuchi

[11] E Patent Number: Re. 36,726

[45] Reissued Date of Patent: Jun. 6, 2000

[54] RELEASE SWITCH APPARATUS

[75] Inventor: Shinichi Kakiuchi, Tokyo, Japan

[73] Assignee: Asahi Kogaku Kogyo Kabushiki Kaisha, Tokyo, Japan

[21] Appl. No.: 08/376,454

[22] Filed: Jan. 23, 1995

Related U.S. Patent Documents

Reissue of:

[64] Patent No.: 5,072,248
Issued: Dec. 10, 1991
Appl. No.: 07/620,565
Filed: Dec. 3, 1990

U.S. Applications:

[63] Continuation of application No. 08/164,438, Dec. 9, 1993, abandoned.

[30] Foreign Application Priority Data

Dec. 1, 1989 [JP] Japan ..... 1-313204
Dec. 1, 1989 [JP] Japan ..... 1-313205

[51] Int. Cl.[7] ..... G03B 17/00

[52] U.S. Cl. ..... 396/263; 396/267; 396/502; 396/543; 396/100; 396/106

[58] Field of Search ..... 396/100, 106–110, 396/263, 267, 502, 543

[56] References Cited

U.S. PATENT DOCUMENTS

| | | | |
|---|---|---|---|
| 4,230,400 | 10/1980 | Wick et al. | 396/100 |
| 4,295,724 | 10/1981 | Sahara et al. | 354/238 |
| 4,302,084 | 11/1981 | Greenwald et al. | 396/106 |
| 4,464,038 | 8/1984 | Nanba | 396/106 |
| 4,466,724 | 8/1984 | Masunaga | 354/402 |
| 4,529,291 | 7/1985 | Mizogui | 354/443 |
| 5,086,313 | 2/1992 | Misawa | 200/5 R |
| 5,291,232 | 3/1994 | Kobayashi et al. | 354/195.1 |

FOREIGN PATENT DOCUMENTS

| | | |
|---|---|---|
| 2752929 | 5/1979 | Germany . |
| 3035743 | 5/1981 | Germany . |
| 62-145232 | 6/1987 | Japan . |
| 2-30918 | 2/1990 | Japan . |
| 1214753 | 12/1970 | United Kingdom . |
| 1481651 | 8/1977 | United Kingdom . |
| 2072359 | 9/1981 | United Kingdom . |
| 2086065 | 5/1982 | United Kingdom . |
| 2107481 | 4/1983 | United Kingdom . |
| 89 06373 | 7/1989 | WIPO . |

OTHER PUBLICATIONS

An English Language Abstract of Japanese Document No. 62–145232, published Jun. 1987.
DE–Journal: Funkschau 1975, No. 24 p. 59.

*Primary Examiner*—Howard B. Blankenship
*Attorney, Agent, or Firm*—Greenblum & Berstein P.L.C.

[57] ABSTRACT

A release switch apparatus having a release button which is supported in a camera body so as to move between an initial position and a specific operational position in which the release button is pushed down. The apparatus includes a light emitter provided in the release button or in the vicinity thereof and an emission controller for causing the light emitter to emit light when the release button is moved from the initial position. A light receiver is provided in the camera body or in the release button to receive light emitted from the light emitter, and a controller is provided which operates in response to the output to the light receiver.

34 Claims, 15 Drawing Sheets

RELEASE SWITCH APPARATUS

Matter enclosed in heavy brackets [ ] appears in the original patent but forms no part of this reissue specification; matter printed in italics indicates the additions made by reissue.

*This application is a continuation of application Ser. No. 08/164,438, filed Dec. 9, 1993, now abandoned, which is a Reissue Application of application Ser. No. 07/620,565, filed Dec. 3, 1990, which issued as U.S. Pat. No. 5,072,248 on Dec. 10, 1991.*

BACKGROUND OF THE INVENTION

1. Field of the Invention

The present invention relates to a release switch apparatus in which the operational states of a shutter button of a camera can be visually confirmed, and to a release switch apparatus in which a reaction force to the operation of the shutter button can easily be optimized.

2. Description of the Related Art

The release switch of a camera is usually of a two-step type in which a shutter button (release button) is pushed down by a half step for a first operation and by a full step for a second operation, respectively. Specifically, when the shutter button is pushed down by a half step, the photometering mechanism, the automatic focusing mechanism, and so on are actuated, and when it is pushed down by a full step, a shutter release (exposure) device is actuated. To this end, the conventional shutter button has an association member which detects and commences the first and second operations. The association member, which is, for example, in the form of a lever for a mechanical shutter or in the form of a contact switch for an electromagnetic shutter, operates in association with the operation of the shutter button.

A photographer receives (i.e., feels) different reaction forces when operating the release button, depending on whether the half step operation or the full step operation is being employed. The photographer recognizes the half step operation from the reaction thereto.

However, when a picture is taken in cold weather, for example, during outdoor photographing in extremely cold regions, or when photographing at a ski resort in winter, the photographers' fingers are often too numb to feel the reaction or, in cases where the photographer is wearing gloves, he or she is unable to feel the reaction. In addition, in cases where the camera is attached to a tripod or when a photographer actuates the shutter button while looking away from the finder, the photographer has difficulty in feeling the reaction.

To ensure that the photographer feels the reaction to the half step operation, it is possible to increase the reaction force of the association member. However, this tends to cause camera shake, particularly in a light camera. Specifically, when the release button is pushed down by a full step, the photographer tends to push the release button down until the push button reaches a lower movement limit, thus resulting in camera shake to a light camera.

To prevent camera shake, it is necessary to reduce the reaction force to the operation of the shutter button and the reaction force to the operation of the association member. However, it is very difficult for a photographer to feel a reduced reaction force. To optimize the reaction force, it is necessary to adjust the operational forces of various mechanisms which operate in association with the operation of the association member, but this is not technically practicable.

Furthermore, in a conventional camera, it is impossible for the subject being photographed to know when the shutter button is being pushed by a half step or by a full step. In particular, with the use of compact cameras, the subject being taken (i.e., photographed) has difficulty in recognizing the completion of the exposure because the sound made by the release operation is very small.

SUMMARY OF THE INVENTION

The present disclosure relates to subject matter contained in Japanese patent applications No. 01-313204 (filed on Dec. 1, 1989) and No. 01-313205 (filed on Dec. 1, 1989) and which are expressly incorporated herein by in their entirety.

The primary object of the present invention is to provide a release switch apparatus in which the operation of the shutter button can be confirmed visually.

To achieve the object mentioned above, according to the present invention, there is provided a release switch apparatus having a release button which is supported in a camera body so as to move between an initial position and an operational position in which the release button is pushed down to a specific position. A light emitter is provided in the release button or in the vicinity thereof and an emission control means for causing the light emitter to emit light when the release button is moved from the initial position is also provided. A light receiver provided in the camera body or the release button to receive light emitted from the light emitter, and a control mechanism which operates in response to the output of the light receiver is provided.

With this arrangement, a photographer can know the operational states of the release button when the release button lights up.

Another object of the present invention is to provide a release switch apparatus in which an optimum operational force of the shutter button can be easily obtained.

To achieve this object, the release button is elastically biased to its initial position by an elastic member.

Since the reaction force depends only on the elastic biasing force of the elastic member, the force necessary for pushing the release button can be easily optimized, depending on the weight of the camera, and so on.

BRIEF DESCRIPTION OF THE DRAWINGS

The invention will be described below in detail with reference to the accompanying drawings, in which.

DESCRIPTION OF THE PREFERRED EMBODIMENTS

Figure 1A:
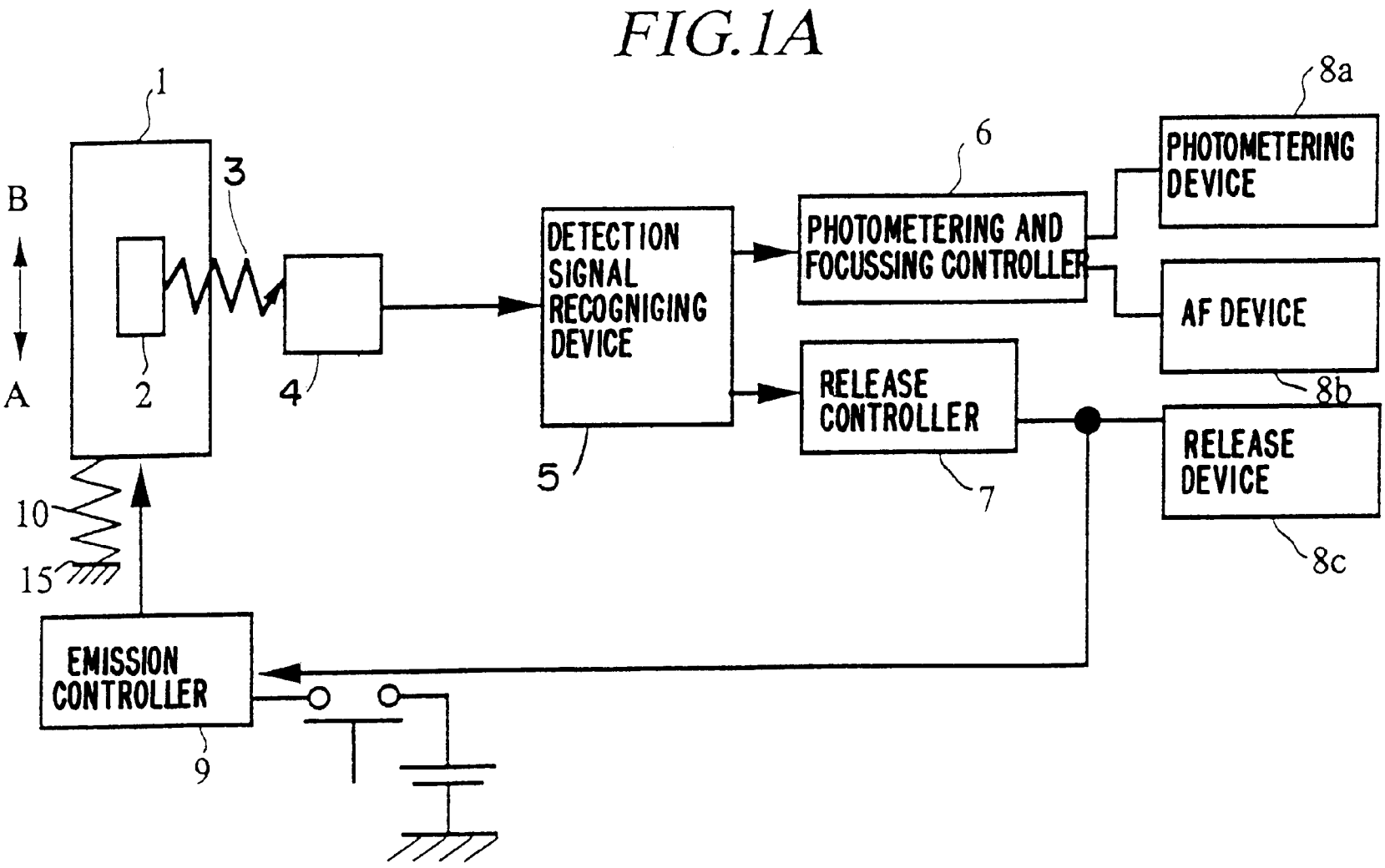
FIGS. 1A and 1B are schematic block diagrams of a camera having a release switch incorporated therein, according to different embodiments of the present invention.

FIG. 1A schematically shows a block diagram of the control unit of a camera having a release switch incorporated therein according to the present invention.

A release button 1 is supported to move relative to a camera body 15 in the directions shown by arrows A-B. The release button 1 is continuously biased by a return spring 10 in the direction B toward its initial position in which the release button 1 projects from the camera body 15. When the release button 1 is pushed down in the direction A into the camera body 15 against the return spring 10, the release operation is effected. The release button 1 has a light emitter 2 incorporated therein. The light emitter 2 is optically connected to a light receiver 4 provided in the camera body through a light path 3 which is schematically shown in FIG. 1A. The emission of light of the light emitter 2 is controlled by an emission controller 9.

The light receiver 4 is connected to a detection signal recognizing device 5 which detects when the light receiver 4 receives light from the light emitter 2 and which is connected to a photometering and focusing controller 6 (first control means) which controls the automatic focusing operation and the photometering operation (optimum exposure value setting operation) and a release controller 7 (second control means) which controls the exposure operation.

The detection signal recognizing device 5 detects whether the release button 1 is pushed down by half a step or by a full step in accordance with the output of the light receiver 4. When the detection signal recognizing device 5 detects that the release button 1 is pushed down by a half step, the detection signal recognizing device 5 generates a command signal to the photometering and focusing controller 6. On the other hand, when the detection signal recognizing device 5 detects that the release button 1 is pushed down by a full step, the detection signal recognizing device 5 generates a command signal to the release controller 7.

The photometering and focusing controller 6 operates a photometering device 8a in response to the command signal to meter (or measure) the luminance (or brightness) of a subject to be taken (i.e., photographed) thereby and to set exposure factors (diaphragm value and shutter speed), based on a predetermined algorithm in accordance with the luminance data thus detected, the film sensitivity, and so on. Furthermore, the photometering and focusing controller 6 operates an automatic focusing device 8b to move the focusing lens (not shown) to a focal position in order to effect the focusing operation.

The release controller 7 operates in response to the command signal to actuate a release device (diaphragm/shutter device) 8c in accordance with the exposure factors set by the photometering and focusing controller 6 in order to carry out the releasing (exposure) operation.

In the illustrated embodiment, although the detection signal recognizing device 5, the photometering and focusing controller 6, the release controller 7, and the emission controller 9 are separate devices, these can be contained in a single device, for example a microcomputer.

Figure 1B:
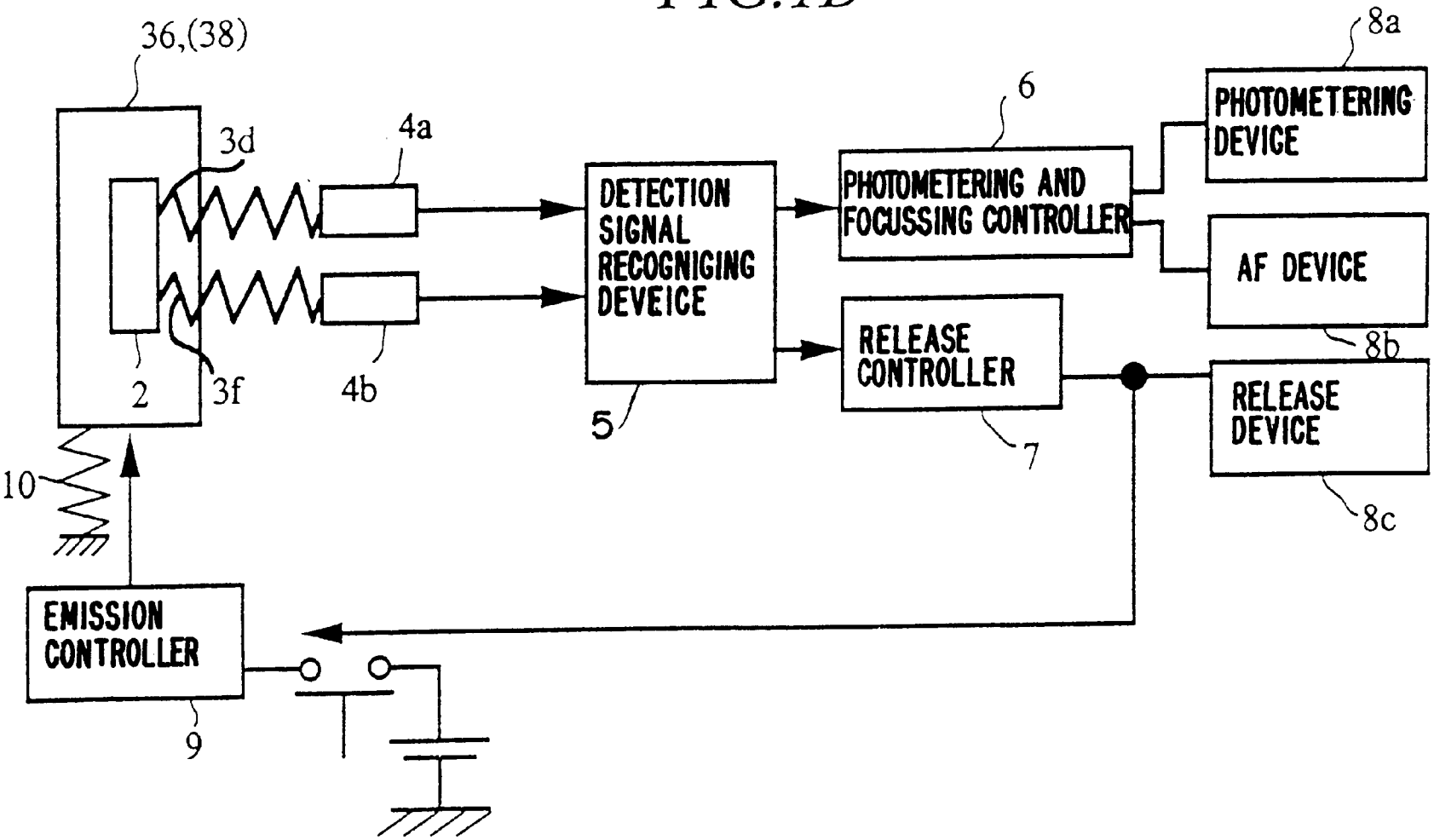

In a modified embodiment shown in FIG. 1B, two light receivers receiving elements 4a and 4b are provided, which will be discussed in more detail hereinafter.

Figure 2:
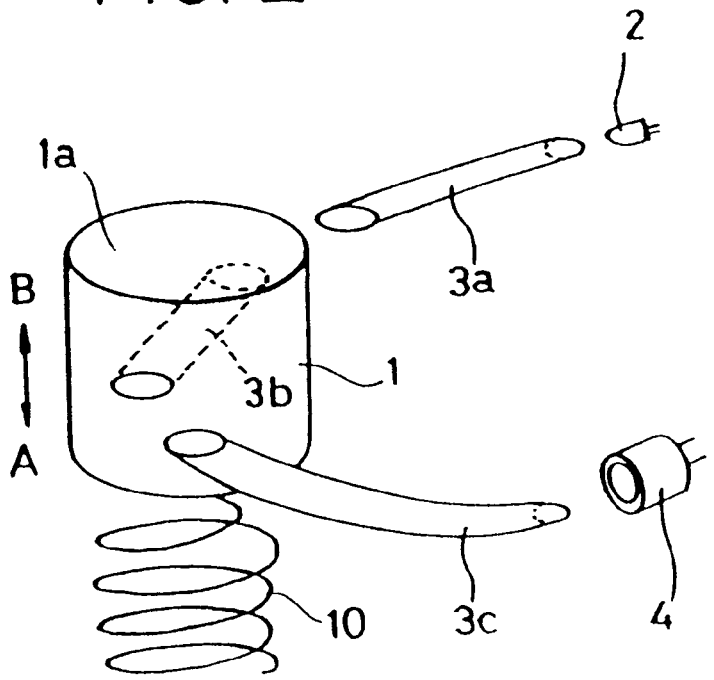
FIGS. 2, 3, 4 and 5 are schematic views of different embodiments of the release button according to the present invention.
Figure 3:
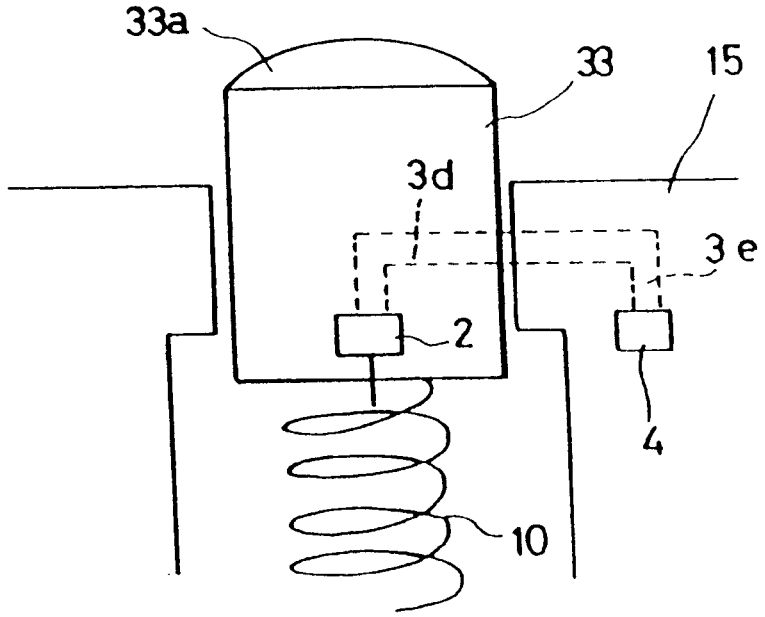

FIGS. 2 and 3 are conceptual views of a first embodiment of a release switch according to the present invention.

In FIG. 2, the release switch has a release button 1, which is supported in the camera body so as to move between an initial position, a first position and a second position, a light emitter 2 and a light receiver 4, and an optical path 3b. The optical path 3b is provided in the release button 1 to optically and selectively connect the light emitter 2 and the light receiver 4. The release button 1 is movable in the directions shown by arrows A-B relative to the camera body. The release button 1 is provided on its lower portion with a coil spring (return spring) 10 which continuously biases the release button 1 toward the initial position (direction B). The release button 1 has the optical path 3b which is laterally extends through the release button 1. The camera body has optical paths 3a and 3c which are positioned opposite to the ends of the optical path 3b. The other ends of the optical paths 3a and 3c are positioned opposite to the light emitter 2 and the light receiver 4, respectively. Consequently, the optical connection between the optical paths 3a, 3b and 3c is broken when the end faces of the optical path 3b are offset from the associated end faces of the optical path 3a and 3c. Conversely, when the release button 1 is pushed down to a predetermined position, the optical connection between the optical paths 3a, 3b and 3c is established, so that light emitted from the light emitter 2 is transmitted to the light receiver 4.

The release button 1 serves also as an optical path by which light leaked from the portion other than the end faces of the optical path 3b is emitted outward from a pressing surface (top surface) 1a of the release button 1.

Preferably, the optical paths 3a, 3b and 3c are made of flexible optical fibers, so that the light emitter 2 and the light receiver 4 can be located at optional positions.

In a modified embodiment shown in FIG. 3, the light emitter 2 and the light receiver 4 are provided in the release button 33 and the camera body 15, respectively. On the side face of the release button 33 a light emission path 3d is formed which introduces light emitted from the light emitter 2 to the outside of the camera body 33. The camera body 15 has another optical path 3e which optically connects light transmitted from the end face of the optical path 3d to the light receiver 4. The optical paths 3d and 3e are preferably made of an optical fiber. The release button 33 serves also as an optical path which emits light emitted by the light emitter 2 from the pressing surface 33a of the release button 33.

Since the release button 33 is movable up and down in FIG. 3, the light emitted from the light emitter 2 can be effectively received by the light receiver 4 when the end face of the optical path 3d of the release button 33 registers with the end face of the optical path 3e of the camera body 15.

Figure 4:
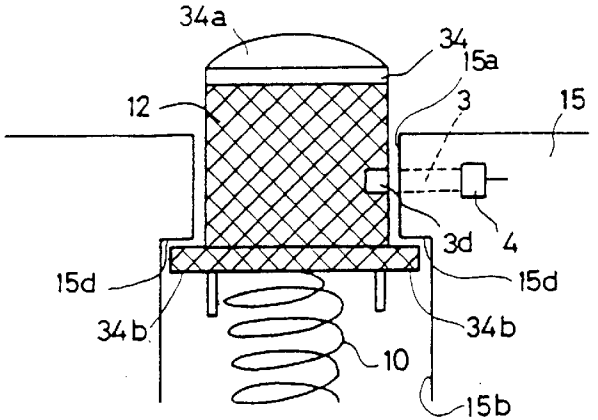

In a modified arrangement shown in FIG. 4, the release button 34 itself constitutes a light emitting element and the release button 34 serves as a light emitting optical path, so that light is emitted from the operating (pressing) surface 34a of the release button 34. Furthermore, in order to form a light emission optical path (light emission window) 3d which introduces the light emitted by the release button 34 into the light receiver 4 in the camera body 15, the unnecessary peripheral surface portion of the release switch 34 other than the light emission window is coated with a light intercepting film 12, so that the release button 34 functions similarly to the release button 33 shown in FIG. 3.

The operational force for operating the release switch (FIG. 1A) as constructed above depends only on the reaction characteristics (spring constant) of the return spring 10; thus, an optimum operational force of the release switch can be easily obtained.

The release button 34 is movably supported in a button guide hole 15a formed in the camera body 15 and a escaping hole 15b connected to the button guide hole 15a. The release button 34 has at its lower end a flange portion 34b integral therewith which restricts the initial position in which the flange portion 34b comes into contact with a stepped stop (shoulder portion) 15d which is formed between the button guide hole 15a and the escaping hole 15b. If the release button 34 is cylindrical, a key and key way are provided on the release button 34 and the camera body 15 to prevent the release button from rotating. Such a rotation preventing means (e.g. key and key way) is unnecessary if the release button has a non-circular cross sectional shape (e.g. elliptical or polygonal shape). This can be applied to all of the embodiments mentioned above and those that will be described below.

Figure 5:
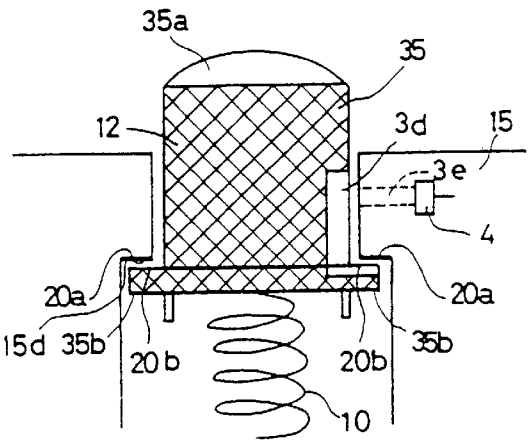

FIG. 5 shows another embodiment of the release switch 35 which is basically similar to the release switch shown in FIG. 4 except for the following features. Namely, in FIG. 5, the stepped stop 15d has an electrical contact 20a which comes into contact with an electrical contact 20b provided on the upper surface of the flange portion 35b of the release switch 35 at the initial position. Furthermore, the light emission window (light emitting path) 3d which is defined by the light intercepting film 12 is elongated in the direction of the movement of the release button 35. Light emitted from the release button 35 is emitted from the operating surface (pressing surface) 35a of the release button 35.

The release button 35 is normally maintained in the initial position by the coil spring 10, so that the contacts 20a and 20b are in contact with each other. When the release button 35 is pushed down by a half step, the release button 35 comes to a half step position (intermediate position) in which the contact 20b separates from the contact 20a, as shown in FIG. 5. In this intermediate position, the release button 35 emits light which is received by the light receiver 4. The output signal of the light receiver 4 is input to the detection signal recognizing device 5 (FIG. 1A) which issues and sends a command signal in response to the detection signal to the photometering and focusing controller 6. As a result, the photometering and focusing controller 6 causes the photometering device 8a and the automatic focusing device 8b to set the exposure value and perform the focusing, respectively.

When the release button 35 is further pushed down by a full step, the light emitting optical path 3d is offset from the light entrance path 3e, so that the optical connection there between is broken. As a result, the light receiver 4 no longer receives light from the release button 35. This is detected by the detection signal recognizing device 5 which sends the command signal to the release controller 7 which in turn causes the release device 8c to perform the exposure operation. Upon completion of the exposure operation, the emission controller 9 causes the light emitter 2 to stop the emission.

When a photographer's finger is released from the release button 35, the latter is moved upward to project from the camera body by the coil spring 10, so that the contact 20b comes into contact with the contact 20a again. Consequently, the detection signal recognizing device 5 and so on are reset and returned to the initial position. The emission controller 9 stops the emission. Alternatively, it is possible for the emission controller 9 to stop the emission when the release controller 7 outputs the shutter operation signal.

FIGS. 16A~16D show different examples of a control circuit for lighting up the release button 35 upon the separation of the contacts 20a and 20b, and will be described below.

Figure 11A:
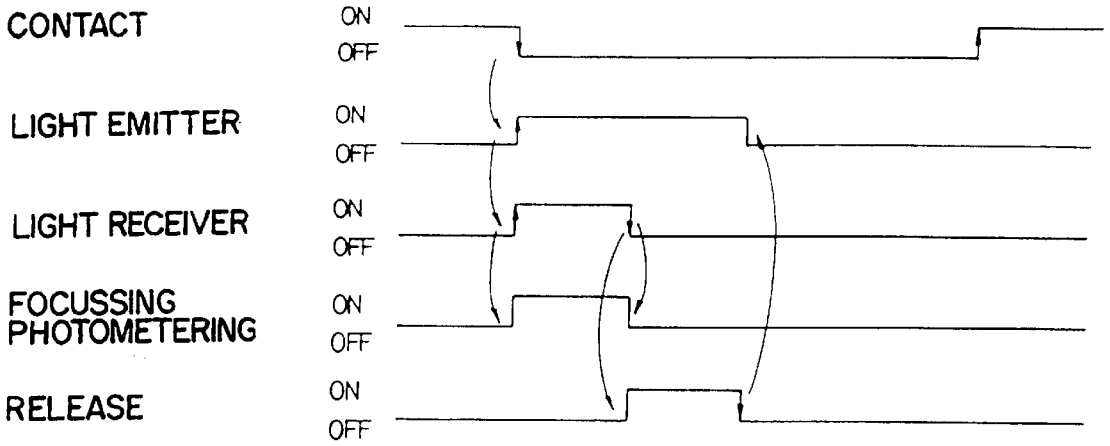
FIGS. 11A and 11B are timing charts of the operations of the release switch shown in FIG. 5.
Figure 11B:
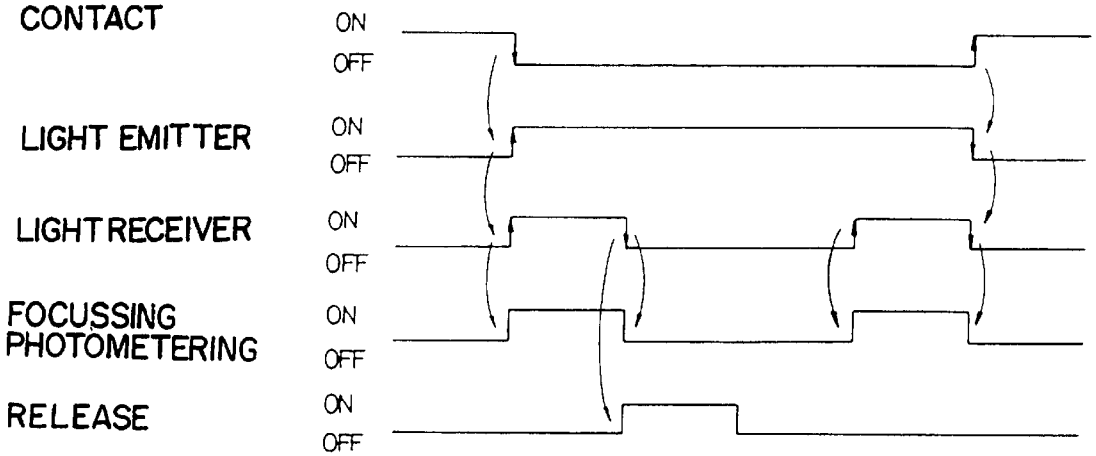

FIGS. 11A and 11B show timing charts of the above-mentioned operations.

Note that it is possible to make the release button 35 of a light receiving element, wherein the light receiver 4 in the camera body is replaced with a light emitter to perform the same function as mentioned above.

If a two-color light emitter is used, it is possible to change the color when the exposure is effected or during the exposure in order to let a photographer or a third person visually confirm the state of the shutter release operation. Such a color indication is particularly useful during a self-timed photograph using a tripod or when a photographer pushes the shutter button while looking away from the finder.

Figure 6A:
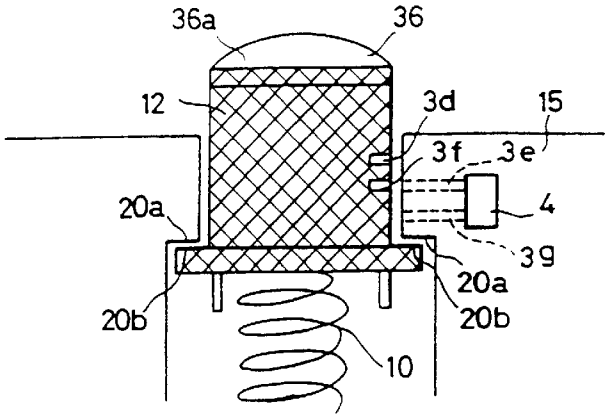
FIGS. 6A and 6B are schematic views of another embodiment of the release button shown in different operational positions, according to the present invention.
Figure 6B:
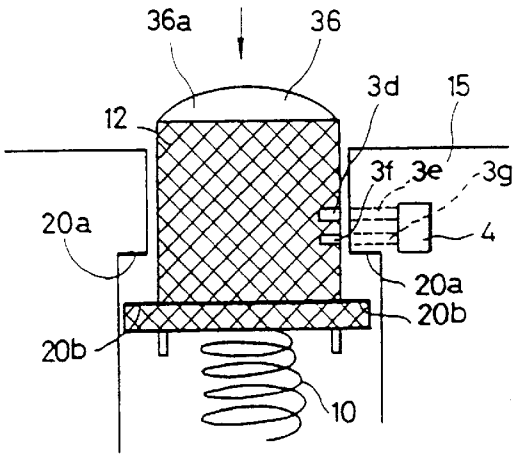

In the release switch shown in FIGS. 6A and 6B, the release button 36 is coated with the light intercepting film 12 which forms first and second light emission windows (optical paths) 3d and 3f, spaced from one another in the direction of the movement of the release switch 36. The camera body 15 has first and second incident paths (incident windows) 3e and 3g corresponding to the first and second optical paths 3d and 3f. The incident paths 3e and 3g are connected to a common light receiver 4.

Alternatively, it is possible to provide two independent light receivers 4 corresponding to the incident paths 3e and 3g, respectively. Light emitted from the release button 36 is also emitted from the operating surface (pressing surface) 36a.

In the release switch shown in FIGS. 6A and 6B, when the release button 36 is pushed down by a photographer, the contact 20b separates from the contact 20a, so that the release button 36 emits light, as shown in FIG. 6A. When the release button 36 is further pushed down to a first position in which the second emission path 3f of the release button 36 is substantially registered with the first incident path 3e of the camera body 15 (FIG. 6A), the light receiver 4 receives light emitted from the release button 36. The receipt of the light is detected by the detection signal recognizing device 5 (FIG. 1A), so that the photometering and focusing controller 6 causes the photometering device 8a and the automatic focusing device 7 to set the exposure value and effect the focusing, respectively.

A further downward movement of the release button 36 to a second position in which the first and second optical paths 3d and 3f of the release button 36 are substantially registered with the corresponding first and second optical paths 3e and 3g of the camera body 15, respectively, causes the light receiver 4 to receive a higher intensity of light emitted from the release button 36 than at the first position shown in FIG. 6A, as shown in FIG. 6B. This is detected by the detection signal recognizing device 5, so that the shutter release operation is carried out by the release device 8c through the release controller 7 (FIG. 1B).

In order to perform the above-mentioned control by digitally changing the level (intensity or quantity) of light received by the light receiver 4, it goes without saying that the detection signal recognizing device 5 must be capable of detecting such a digital change in light intensity.

Figure 12A:
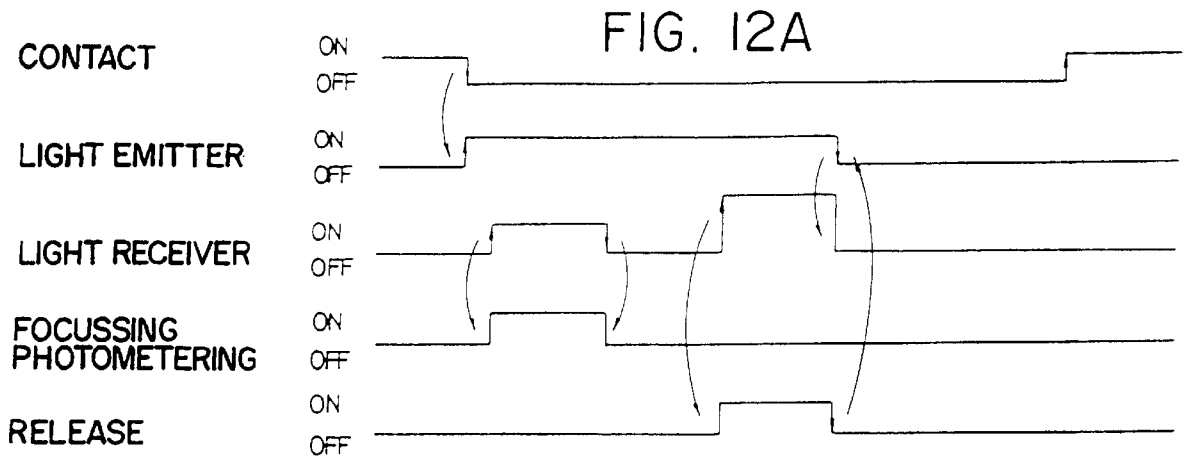
FIGS. 12A and 12B are timing charts of the operations of the release switch shown in FIGS. 6A and 6B.

In the case where two light receivers 4 are provided corresponding to the optical paths 3e and 3g, the detection signal recognizing device 5 is constructed in such a way that the focusing operation and the exposure value setting operation are performed when one of the light receivers detects a predetermined quantity of light, and the release operation is performed when both the light receivers 4 detect a predetermined quantity of light. These operations are shown in a timing chart of FIG. 12A.

Figure 12B:
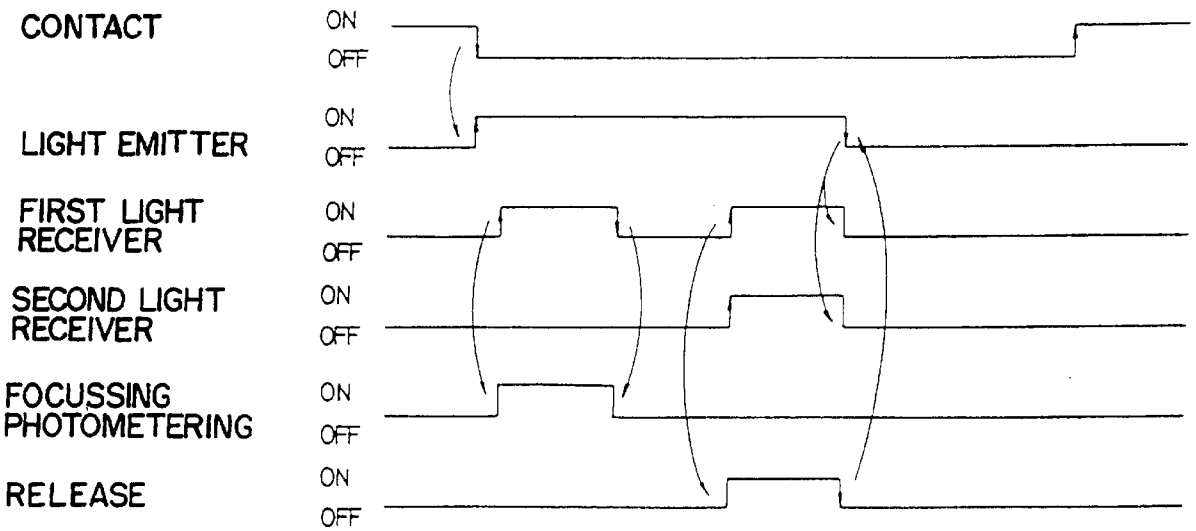

FIG. 12B shows a timing chart of the operations when the light receiver consists of two light receivers. In FIG. 12B, the first operation (focusing and photometering, etc.) is performed when the first light receiver receives a predetermined quantity of light and the first operation is stopped when the first light receiver does not receive a predetermined quantity of light. Thereafter, the exposure operation (second operation) is performed when both the first and second light receivers receive a predetermined quantity of light. Upon completion of the exposure, the emission of light of the light emitter is stopped. After that, when the contacts 20a and 20b are closed (i.e. contacted with each other), the light emitter is reset.

Figure 7A:
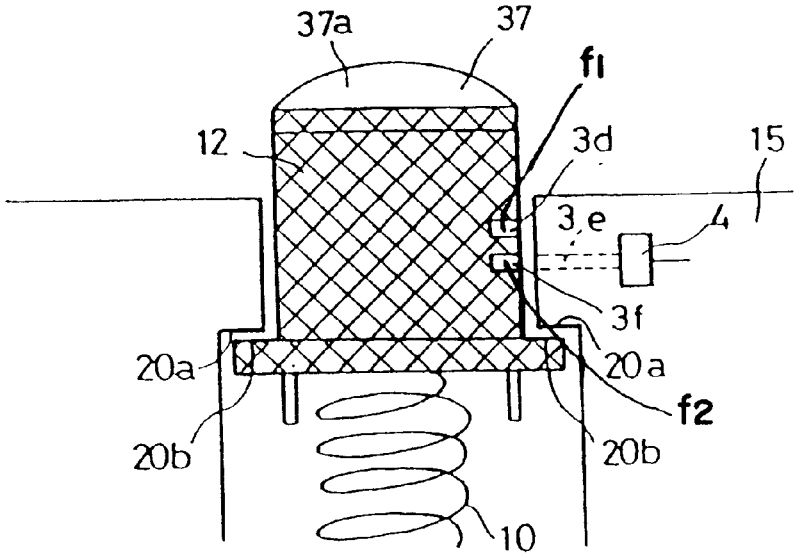
FIGS. 7A and 7B are schematic views of still another embodiment of the release button shown in different operational positions, according to the present invention.
Figure 7B:
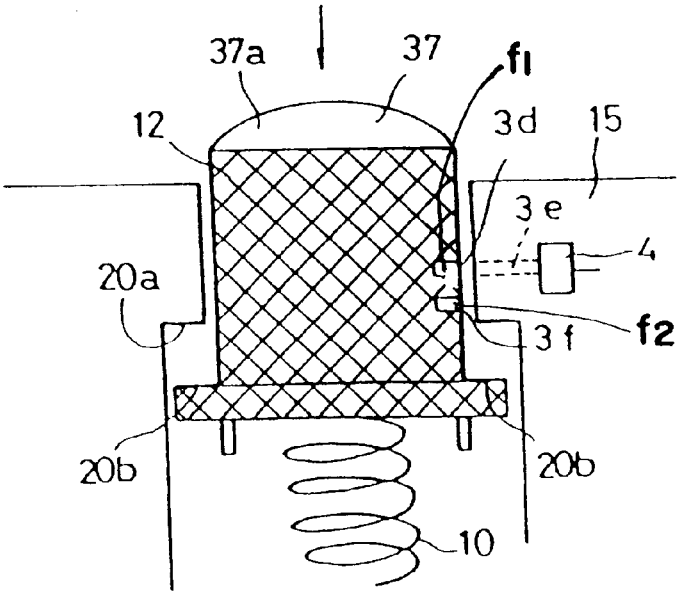

The release switch shown in FIGS. 7A and 7B is basically similar to the release switch shown in FIGS. 6A and 6B, except for the provision of filters on the optical paths 3d and 3f. Namely, the first and second optical paths 3d and 3f of the release button 37 are coated with respective filters f1, f2 having different light transmission efficiencies or light reflection efficiencies, so that different quantities of light or different wavelengths of light can be transmitted through the filters. Furthermore, only one incident path 3e is provided in the camera body 15 in the arrangement shown in FIGS. 7A and 7B.

The quantity (or intensity) of light which is received by the light receiver 4 when the second optical path (emission path) 3f is registered with the optical path (incident path) 3e, that is, when the release button 37 is pushed down by a half step as shown in FIG. 7A, is different from the quantity (or intensity) of light which is received by the light receiver 3 when the first optical path (emission path) 3d is registered with the optical path (incident path) 3e, that is, when the release button 37 is pushed down by a full step, as shown in FIG. 7B, due to the presence of the filters having different light transmission efficiencies. The detection signal recognizing device 5 detects the digital change in quantity (or intensity) of light received by the light receiver 4 to control the focusing operation and the setting operation of the exposure value to control the exposure operation. Note that light is emitted also from the operating surface (pressing surface) 37a of the release button 37. It is possible to use a light receiver in which the sensitivity varies depending on the wavelength of light received thereby to simplify the discrimination of the output levels thereof.

Figure 13:
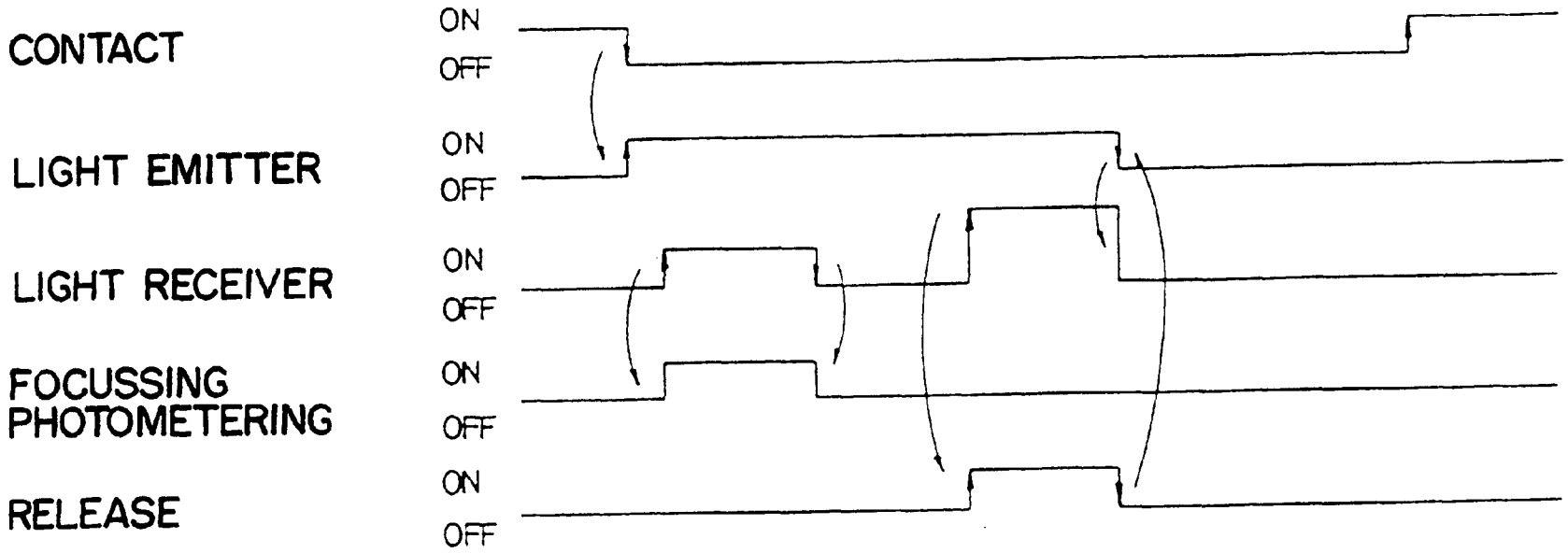
FIG. 13 is a timing chart of the operations of the release switch shown in FIGS. 7A and 7B.

The operations of the release switch shown in FIGS. 7A and 7B is shown in the timing chart shown in FIG. 13. In the timing chart, the intensity of light output from the second emission path 3f is smaller than that output from the first emission path 3d. Conversely, if the intensity of light output from the second emission path 3f is higher than that output from the first emission path 3d, the arrangement of wave shapes is reversed.

Figure 8A:
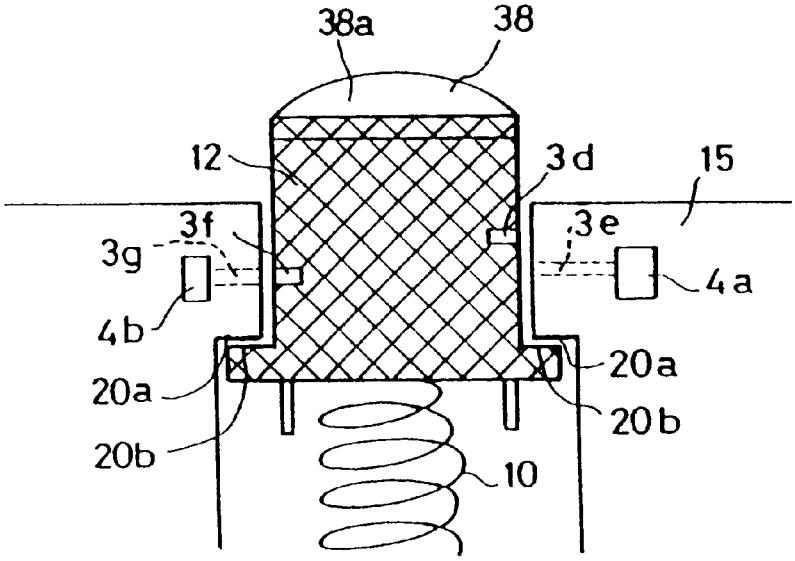
FIGS. 8A, 8B and 9A and 9B are schematic views of two different embodiments of the release button shown in different operational positions according to the present invention.
Figure 8B:
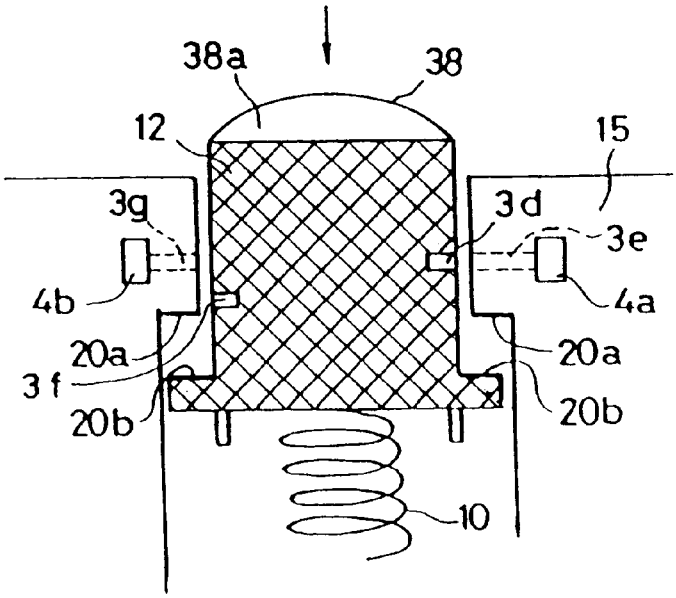

A release switch 38 shown in FIGS. 8A and 8B is slightly different from the release switch shown in FIGS. 6A and 6B in the arrangement of the optical paths 3d and 3f. Namely, in FIGS. 8A and 8B, the first and second optical paths (emission paths) 3d and 3f are circumferentially spaced from one another on the periphery of the release button 38. The first and second incident paths 3e and 3g are provided in the camera body 15 so as to be opposed to the respective optical paths (emission paths) 3d and 3f, respectively. The incident paths 3e and 3g are connected to the respective light receivers 4a and 4b. Light is emitted from the operating surface 38a of the release button 38.

When the release button 38 is pushed down by a half step, as shown in FIG. 8A, the second emission path 3f is registered with the second incident path 3g, so that the second light receiver 4b receives light from the emission path 3f. This is detected by the detection signal recognizing device 5, so that the photometering and focusing controller 6 causes the photometering device 8a and the automatic focusing device 8b to set the exposure value and effect the focusing operation, respectively.

Figure 14:
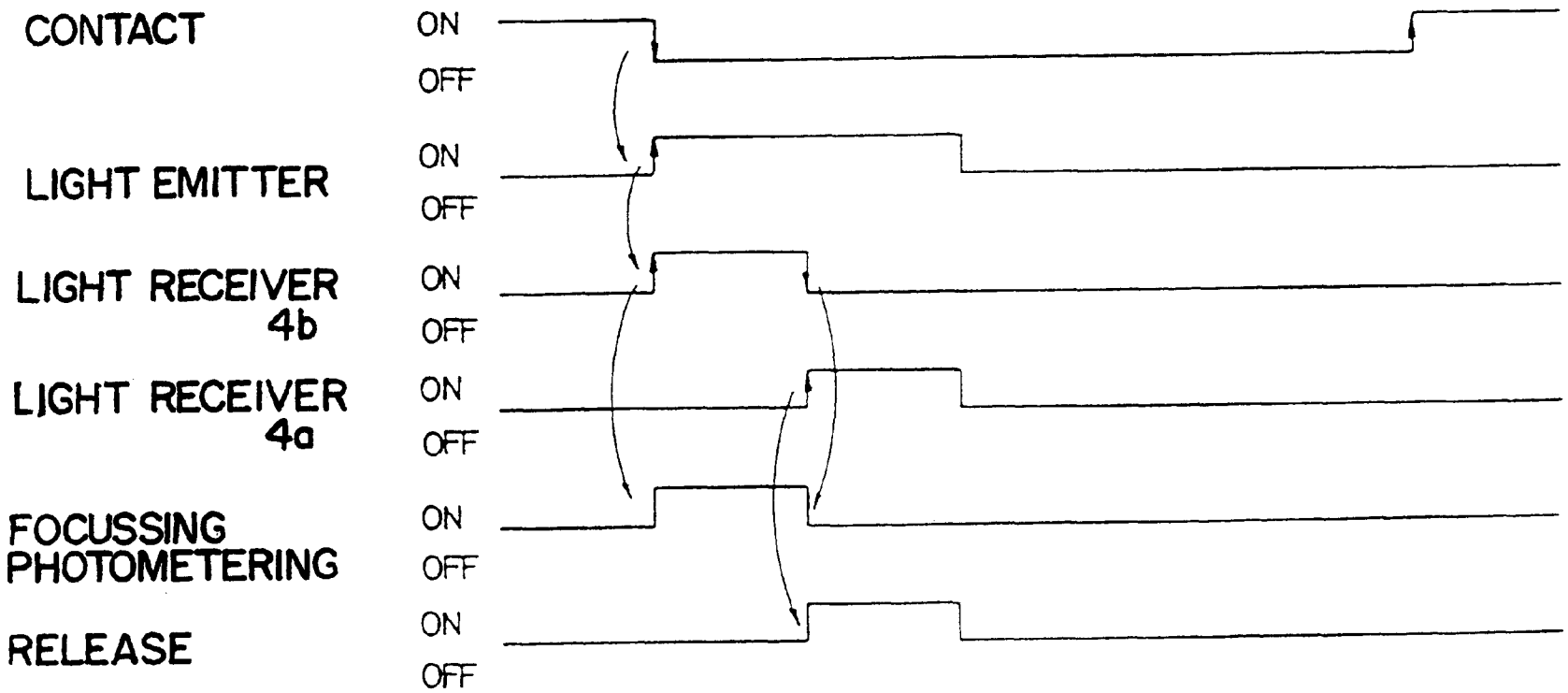
FIG. 14 is a timing chart of the operations of the release switch shown in FIGS. 8A and 8B.

When the release button 38 is pushed down to the second position by a full step, as shown in FIG. 8B, the first emission path 3d is registered with the first incident path 3e, so that the first light receiver 4a receives light emitted from the light emitter 2 through the first emission path 3d. The receipt of light of the first light receiver 4a is detected by the detection signal recognizing device 5, so that the release controller 7 causes the release device 8c to effect the exposure. The operations mentioned above are as shown in the timing chart of FIG. 14.

Figure 9A:
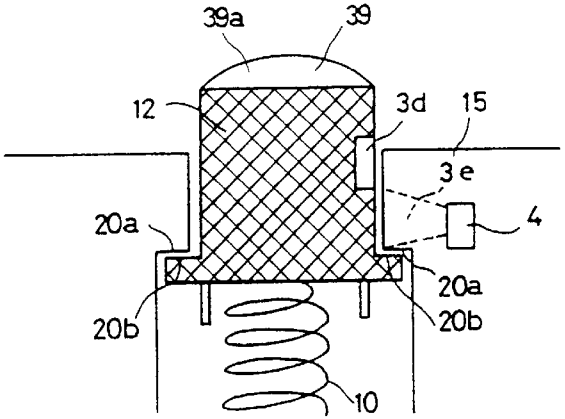
Figure 9B:
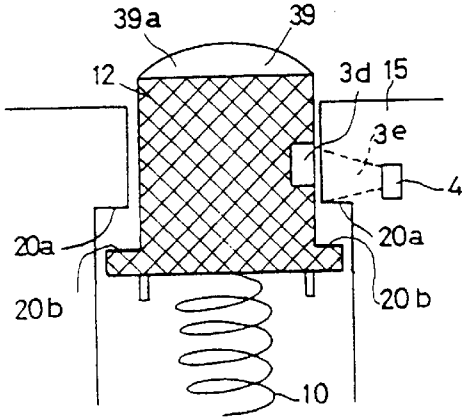

A release switch shown in FIGS. 9A and 9B is basically similar to the release switch shown in FIG. 5 except for an elongated emission path 3d which is provided in the release button 39 to extend in the direction of the movement of the release button 39 and a wide optical path (incident path). 3e connected to the light receiver 4 which can detect both the half step operation and full step operation of the release button 39. Light is emitted from the operating surface 39a of the release button 39.

The release switch 39 operates as follows.

When the release button 39 is pushed down by a half step, as shown in FIG. 9A, the contact 20b separates from the contact 20a, so that the release button 39 emits light. A further downward movement of the release button 39 increases the sectional area of the registration of the emission path 3d of the release button 39 with the incident path 3e of the camera body 15. The increased sectional area of registration increases the intensity (level) of light received by the light receiver 4.

The intensity of light received by the light receiver 4 is detected by the detection signal recognizing device 5 which judges the half step operation when the intensity of light is above a first predetermined value. As a result, the detection signal recognizing device 5 sends the command signal to the photometering and focusing controller 6 which causes the photometering device 8a and the automatic focusing device 8b to set the exposure value and effect the focusing operation, respectively.

When the release button 39 is pushed down by a full step, as shown in FIG. 9B, the intensity of light is above a second predetermined value. As a result, the detection signal recognizing device 5 sends the command signal to the release controller 7 which causes the release device 8c to effect the release operation.

To perform the control mentioned above in accordance with the intensity of light which analogically varies, the detection signal recognizing device 5 must function to detect the analogical change of the intensity of light.

Figure 15:
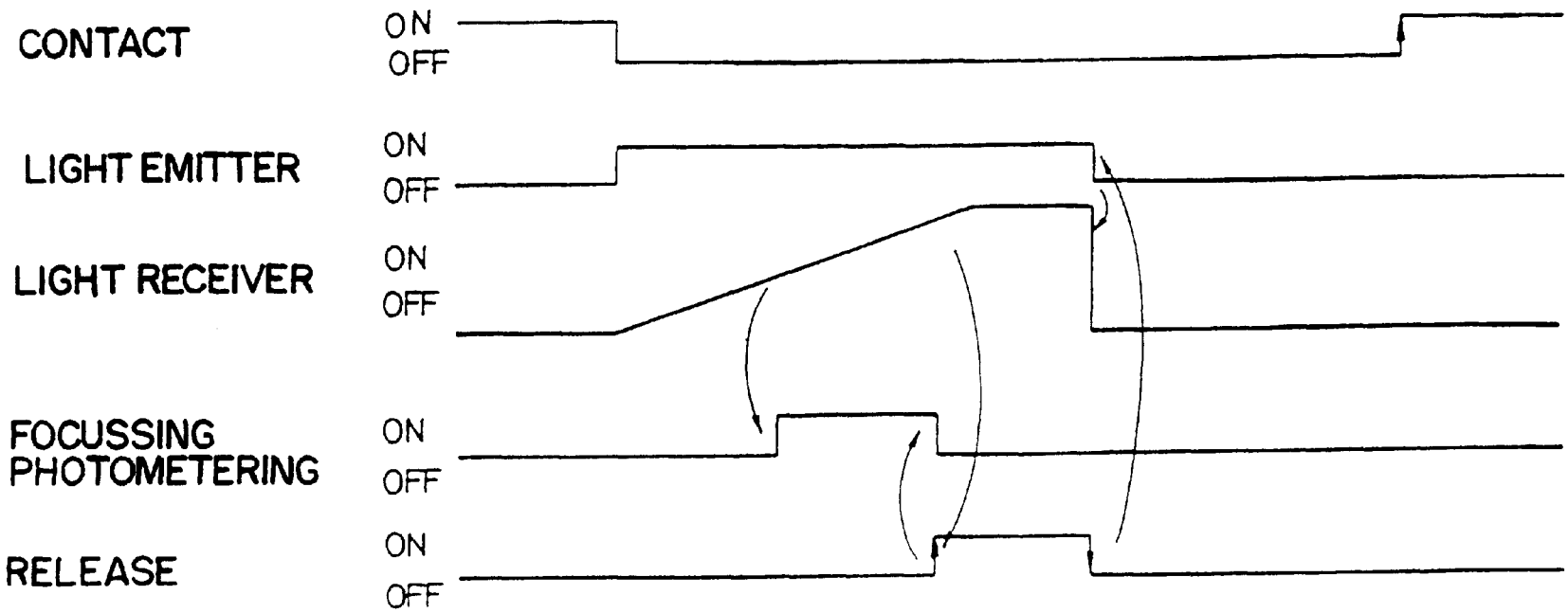
FIG. 15 is a timing chart of the operations of the release switch shown in FIGS. 9A and 9B.

The operation of the release switch 39 is as shown in a timing chart of FIG. 15.

Figure 10:
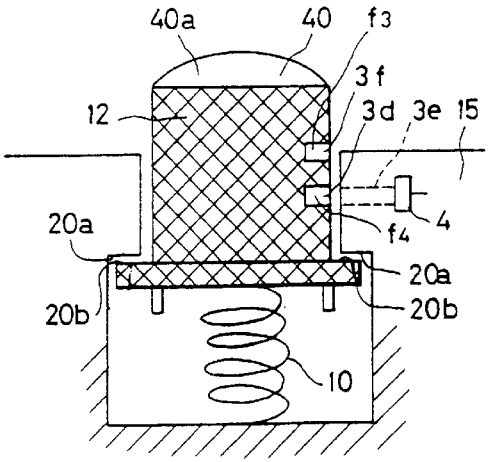
FIG. 10 is a schematic view of still another embodiment of the release button according to the present invention.

The release switch shown in FIG. 10 is basically similar to the release switch shown in FIG. 4, except for two emission paths 3d and 3f which are provided in the release button 40, itself comprised of a two-color light emission element, and spaced from one another in the direction of the movement of the release button 40. The first and second emission paths 3d and 3f have first and second filters f3, f4 attached thereto, which permit the first and the second colors of light to pass therethrough and do not permit the second and first colors of light to pass there through, respectively.

Figure 17:
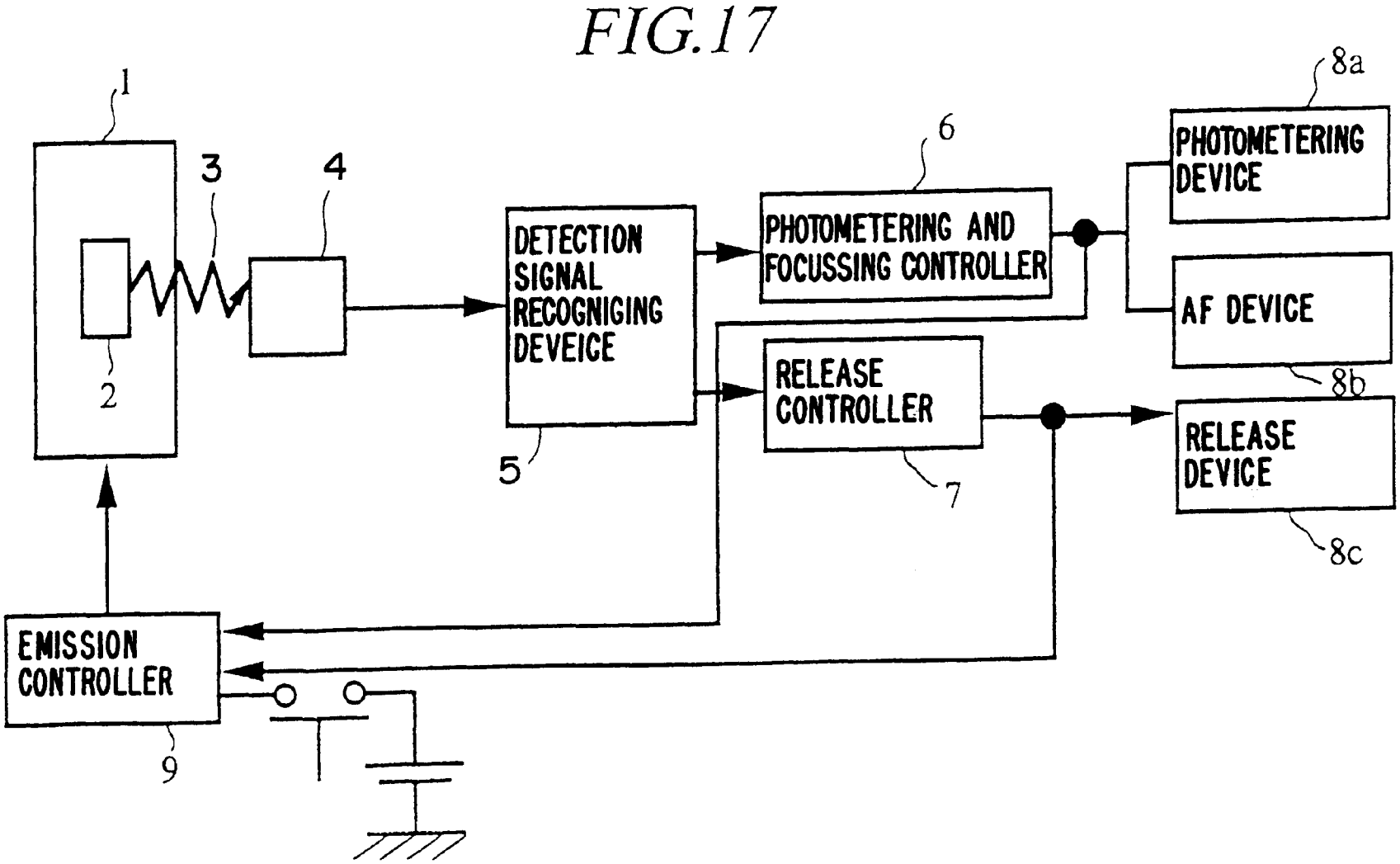
FIG. 17 is a block diagram of a control circuit of an embodiment in which a two-color light emitting element is used for the release button; and, FIG. 18 is a timing chart of the release switch which is made of a two-color light emitting element.

FIG. 17 shows a block diagram of a control unit of the embodiment shown in FIG. 10. In the control unit shown in FIG. 17, the color of light to be emitted from the light emitter 2 is varied by the emission controller 9 in accordance with the output of the photometering and focusing controller 6, unlike the embodiment shown in FIG. 1A. In the embodiment illustrated in FIG. 17, the first filter of the first optical path 3d permits a first color of light to pass therethrough but does not permit a second color of light to pass, and the second filter of the second optical path 3f permits the second color of light to pass therethrough but does not permit the first color of light to pass, respectively.

When the release button 40 is pushed down a half step by the photographer, the contact 20b separates from the contact 20a so that the release button 40 emits the first color of light. When the release button 40 is further pushed down, the first emission path 3d is registered with the incident path 3e. As a result of this, the light receiver 4 receives the first color of light from the release button 40, since the first filter of the first emission path 3d permits the first color of light to pass therethrough. As a result, the light receiver 4 sends a detection signal to the detection signal recognizing device 5 which sends the command signal to the photometering and focusing controller 6. Consequently, the latter causes the photometering device 8a and the automatic focusing device 8b to set the exposure value and effect the focusing operation, respectively. At this moment, the emission controller 9 causes the release button 40 to emit the second color of light.

When the release button 40 is pushed down by a full step, the second emission path 3f is registered with the incident path 3e. As a result, the light receiver 4 receives the second color of light emitted from the release button 40, since the second filter of the second emission path 3f permits only the second color of light to pass therethrough. As a result, the light receiver 4 sends a detection signal to the detection signal recognizing device 5 which sends the command signal to the release controller 7. Consequently, the latter performs the exposure operation.

Figure 18:
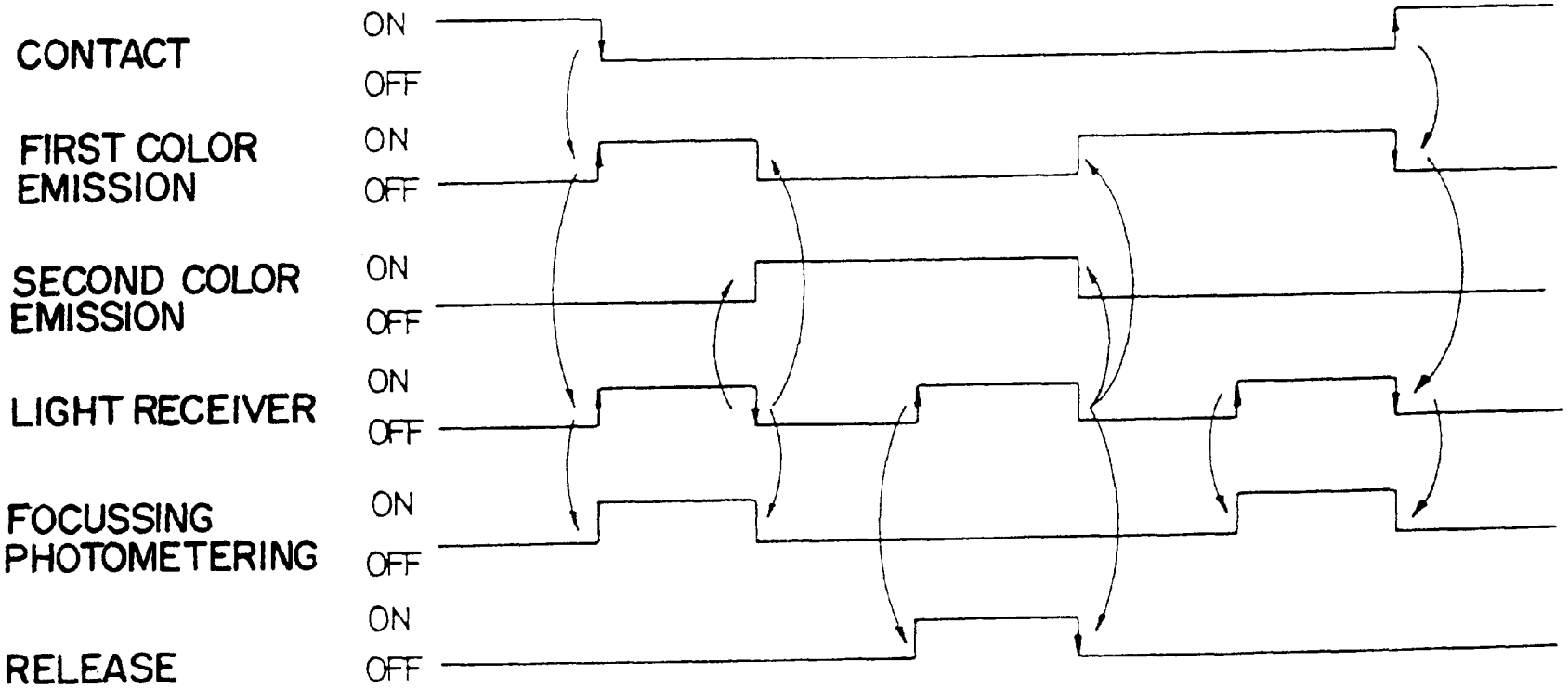

When the external force by the photographer is released from the release button 40, the release button 40 is returned to the initial position by the return spring 10 to project from the camera body. During the return movement, when the optical connection of the second emission path 3f and the incident path 3e is broken, the release button 40 changes the color of light to be emitted therefrom to the first color of light. The above-mentioned operations are as shown in a timing chart of FIG. 18.

FIGS. 16A–16D show different examples of a control circuit for illuminating the release button 35 upon the separation of the contacts 20a and 20b.

Figure 16A:
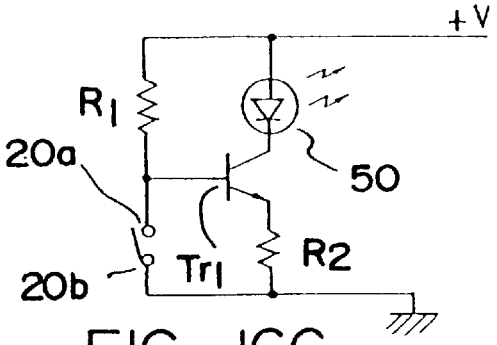
FIGS. 16A, 16B, 16C and 16D are schematic views of different embodiments of a control circuit for illuminating the release button.

FIG. 16A shows a semiconductor control circuit for a light emitting element 50, forming part of the release button 1 and 33–40. An anode end of emitter 50 and one end of a resistor $R_1$ are connected to +V. A cathode end of the emitter 50 is connected to the collector of NPN transistor Tr1. A second end of the resistor $R_1$ is connected to the base of transistor Tr1 and contact 20a. One end of resistor $R_2$ is connected to the emitter of Tr1. A second end of resistor $R_2$ and contact 20b are connected to ground. Separation of contacts 20a, 20b controls illumination of emitter element 50.

Figure 16B:
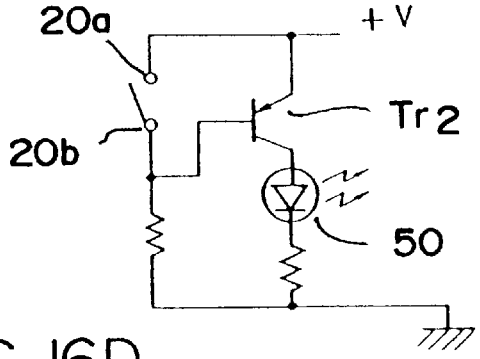

FIG. 16B discloses a similar control circuit constructed to utilize a PNP transistor Tr2. The operation is substantially the same as for the circuit illustrated in FIG. 16a.

Figure 16C:
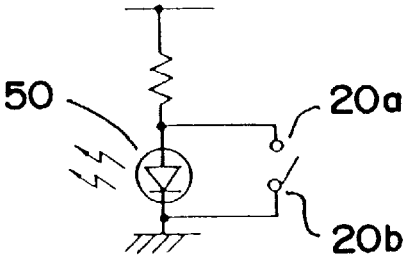

FIG. 16C illustrates a control circuit wherein one end of a current limiting resistor is connected to the anode of emitter 50. The cathode of emitter 50 is connected to ground. The selective opening of contacts 20a and 20b causes the emitter to emit light.

Figure 16D:
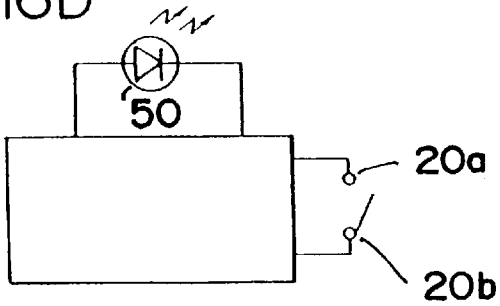

FIG. 16D discloses a microcomputer and driving circuit to which emitter 50 is connected to be selectively driven in response to opening and closing of switch 20. It is known in the art how to construct electronic driving circuits in which the emitter 50 emits light using either normally open or normally closed switches for contacts 20a, 20b.

As can be seen from the foregoing, in the illustrated embodiments, since the release button emits light in accordance with the half step operation thereof, the full step operation, and the commencement of the release operation, the state of the release button can be visually confirmed.

According to the present invention, since the release button 34~40 itself is made of a mold of light emitting material, the assembly of the release switch can be easily and inexpensively effected.

The shape and size of the release button are not limited to those in the illustrated embodiments, but preferably are such that the release button is not completely covered with an operator's finger when the release button is actuated thereby, to ensure that the release button can be at least partially observed.

Furthermore, according to the present invention, since neither the contact nor the lever are pressed during the downward movement of the release button, a substantially constant pressing force which depends only on the spring force of the coil spring 10 can be applied to the release button. The coil spring 10 can be replaced with a leaf spring, sponge or rubber, etc.

Although the light emitter and the light receiver(s) are provided on the release button and the camera body respectively in the illustrated embodiments, it is possible to provide the light emitter and the light receiver(s) on the camera body and the release button, respectively.

In the present invention, it is also possible to make the conventional release button of a light emitting element.

As can be seen from the above discussion, according to the present invention, since the release button emits light in accordance with the operational state of the release button, a photographer can visually confirm and adjust the position of the release button.

If the whole release button is made of a light emitting material, the release switch is simplified and can be easily and inexpensively assembled.

I claim:

1. A release switch apparatus [having] *for a camera, comprising:* a release button which is supported in a camera body so as to move in a predetermined direction between an initial position and a specific operational position in which said release button is pushed down[, comprising:]*;* a light emitter provided in [one of said release button or] said camera body *and movable in association with movement of said release button when said release button is pushed down towards said specific operational position*;

emission control means for causing said light emitter to emit light when said release button is moved from said initial position;

a light receiver which is provided in [the other one of] said camera body [or said release button] to receive light emitted from said light emitter; and[,]

control means which operates in response to the output of said light receiver*;*

*wherein said release button has an operational surface which is pressed by an operator and a light emission path, which emits light, emitted by the light emitter, from said operational surface.*

[2. A release switch apparatus according to claim 1, wherein said release button has an operational surface which is pressed by an operator.]

[3. A release switch apparatus according to claim 2, wherein said release button has a light emission path which emits light, emitted by the light emitter, from said operational surface.]

4. A release switch apparatus according to claim [3] *1*, further comprising biasing means for continuously biasing said release button to the initial position.

5. A release switch apparatus according to claim [3] *1*, fiber comprising electrical contact means for detecting the movement of said release button from said initial position.

6. A release switch apparatus according to claim 5, wherein said electrical contact means comprises electrical contacts which are provided on said camera body and said release button to come into contact with and separate from each other when said release button is in said initial position and when said release button is moved from said initial position.

7. A release switch apparatus according to claim 6, wherein said emission control means causes said light emitter to emit light when said electrical contacts separate from one another.

8. A release switch apparatus according to claim 1, wherein said control means comprises a first control means for metering luminance of an object to be taken to set an exposure factor.

9. A release switch apparatus according to claim 8, wherein said first control means comprises means for automatic focus control of a lens.

10. A release switch apparatus according to claim 1, wherein said control means comprises a second control means for performing an exposure operation.

11. A release switch apparatus according to claim 1, wherein said light emitter is incorporated in said release button to be integral with said release button.

12. A release switch apparatus [according to claim 1,] *for a camera comprising:*

*a release button which is supported in a camera body so as to move in a predetermined direction between an initial position and a specific operational position in which said release button is pushed down;*

*a light emitter provided in said camera body and movable in association with movement of said release button when said release button is pushed down towards said specific operational position;*

*emission control means for causing said light emitter to emit light when said release button is moved from said initial position;*

*a light receiver which is provided in said camera body to receive light emitted from said light emitter; and*

*control means which operates in response to the output of said light receiver;* wherein said release button has a light emission path through which light emitted by said light emitter is emitted in a predetermined direction.

13. A release switch apparatus according to claim 12, wherein said light emission path is an elongated path extending in the direction of the movement of said release button.

14. A release switch apparatus according to claim 13, wherein said camera body has a light incident path which is optically connected to said light emission path when said release button is moved to an intermediate position between said initial position and said specific operational position and which is optically disconnected from said light emission path when said release button is moved to said specific operational position.

15. A release switch apparatus according to claim 12, wherein said light emission path has first and second optical paths which are spaced from one another in the direction of the movement of [the] *said* release button.

16. A release switch apparatus according to claim 15, wherein said camera body has a first incident path which is optically connected to said second optical path of said release button when said release button is moved to an intermediate position between said initial position and said specific operational position, and a second incident path which is optically connected to said second optical path when said release button is moved to said specific operational position.

17. A release switch apparatus according to claim 16, wherein said first and second incident paths are optically connected to said first and second optical paths when said release button is in said specific operational position, respectively.

18. A release switch apparatus according to claim 17, further comprising a detection signal recognizing means for discriminating the output signals of said light receiver, and wherein said control means comprises at least first and second control means for performing different control operations, so that said detection signal recognizing means operates said first and second control means in accordance with the discrimination signal of said detection signal recognizing means.

19. A release switch apparatus according to claim 15, wherein said camera body has one incident path which is optically connected only to said second optical path of said release button when said release button is moved to an intermediate position between said initial position and said specific operational position and which is optically connected only to said first optical path when said release button is moved to said specific operational position.

20. A release switch apparatus according to claim 19, wherein said first and second optical paths are provided with optical filters having different light transmission efficiencies.

21. A release switch apparatus according to claim 20, further comprising a detection signal recognizing means for discriminating the output signals of said light receiver, and wherein said control means comprises at least first and second control means for performing different control operations, so that said detection signal recognizing means operates said first and second control means in accordance with the discrimination signal of said detection signal recognizing means.

22. A release switch apparatus according to claim 19, wherein said first and second optical paths are provided with optical filters which permit different wavelengths of lights to pass therethrough, respectively.

23. A release switch apparatus according to claim 22, further comprising a detection signal recognizing means for discriminating the output signals of said light receiver, and wherein said control means comprises at least first and second control means for performing different control operations, so that said detection signal recognizing means operates said first and second control means in accordance with the discrimination signal of said detection signal recognizing means.

24. A release switch apparatus according to claim 19, wherein said light emitter comprises a two-color light emitting element.

25. A release switch apparatus according to claim 24, wherein said emission control means varies the color of light emitted from said light emitter within a predetermined range on the direction of the movement of said release button.

26. A release switch apparatus according to claim 25, wherein said emission control means causes said light emitter to emit a first color of light and a second color of light when said release button is moved from said initial position and when said second optical path is registered with said second incident path, respectively.

27. A release switch apparatus according to claim 26, wherein said first optical path is provided with an optical filter which permits said second color of light to pass therethrough and does not permit said first color of light to pass therethrough.

28. A release switch apparatus according to claim 27, wherein said second optical path is provided with an optical filter which permits said first color of light to pass therethrough and does not permit said second color of light to pass therethrough.

29. A release switch apparatus according to claim 26, wherein said emission control means causes said light emitter to emit said first color of light when said light receiver no longer receives said second color of light after said light emitter emits said second color of light.

30. A release switch apparatus according to claim 12, wherein said light emmision path has first and second optical paths which are circumferentially spaced from one another about said release button.

31. A release switch apparatus according to claim 30, wherein said camera has a second incident path which is optically connected to said second optical path of said release button when said release button is moved to an intermediate position between said initial position and said specific operational position, and a first incident path which is optically connected to the said fist optical path when said release button is moved to said specific operational position.

32. A release switch apparatus according to claim 31, wherein said first incident path is not optically connected to said first optical path when said release button is in said intermediate position, and said second incident path is not optically connected to said second optical path when said release button is in said specific operational position.

33. A release switch apparatus according to claim 32, further comprising a detection signal recognizing means for discriminating the output signals of said light receivers, and wherein said control means comprises at least first and second control means for performing different control operations, so that said detection signal recognizing means operates said first and second control means in accordance with the discrimination signal of said detection signal recognizing means.

34. A release switch apparatus [having] *for a camera, comprising:* a release button which *is* supported in a camera body so as to move between an initial position and an operational position in which said release button is pushed down to a specific position[, comprising:]*;* a light emitter which is provided in [one of said release button or] said camera body;

emission control means for causing said light emitter to emit light when said release button is moved from said initial position;

a light receiver which is provided in [the other one of] said camera body [or said release button] to receive light emitted from said light emitter; and control means which operates in response to the output of said light receiver;

said release button being provided with an optical path which breaks and establishes an optical connection of said light emitter and said light receiver at said initial position and said specific position, respectively.

*35. The release switch apparatus according to claim 1, said release button comprising said light emitter.*

*36. The release switch apparatus according to claim 1, positioning of said release button spaced from said initial position along a direction towards said specific operational position interrupting a light path between said light emitter and said light receiver.*

* * * * *